United States Patent [19]
Motz et al.

[11] Patent Number: 6,029,397
[45] Date of Patent: Feb. 29, 2000

[54] STABILIZED NATURAL TURF FOR ATHLETIC FIELD

[75] Inventors: Joseph E. Motz; Mark A. Heinlein, both of Cincinnati, Ohio

[73] Assignee: Technology Licensing Corp., Cincinnati, Ohio

[21] Appl. No.: 08/870,541

[22] Filed: Jun. 6, 1997

[51] Int. Cl.[7] .................................................. A01B 79/00
[52] U.S. Cl. ...................... 47/58.1; 47/9; 47/56; 428/17; 405/258
[58] Field of Search ................................ 47/58.1, 56, 9, 47/1.01; 428/17; 405/258

[56] References Cited

U.S. PATENT DOCUMENTS

| | | |
|---|---|---|
| 2,605,589 | 8/1952 | Kuestner . |
| 3,513,062 | 5/1970 | Vinicki . |
| 3,845,584 | 11/1974 | Mercer . |

(List continued on next page.)

FOREIGN PATENT DOCUMENTS

| | | |
|---|---|---|
| 0174755 | 3/1986 | European Pat. Off. . |
| 0204381 | 12/1986 | European Pat. Off. . |
| 0260769 | 3/1988 | European Pat. Off. . |
| 0263566 | 4/1988 | European Pat. Off. . |
| 0373282 | 6/1990 | European Pat. Off. . |
| 403008 | 12/1990 | European Pat. Off. . |
| 2333534 | 1/1977 | France . |
| 2556381 | 6/1985 | France . |
| 2522864 | 12/1976 | Germany . |
| 8112126 | 10/1982 | Germany . |

(List continued on next page.)

OTHER PUBLICATIONS

Andy Boogaard, *Young Utes Will Depend On Home Advantage,* The Fresno Bee, Aug. 23, 1995.
Safety Play Systems Inc., *Nottsward,* Sep. 10, 1992.
Safety Play Systems Inc., *Notts Film,* Sep. 10, 1992.
Notts Sport News, *Notts Sport Grass Reinforcement Passes Tough Scottish Trials,* Notts Sport News, Grass Reinforcement Edition, Spring 1990.
Notts Sport News, *Keep Off—Your Feet Are Killing Me!,* Notts Sports News, Golf Edition.
Safety Play Systems Inc., *The "Envelope" Base System,* Sep. 10, 1992.
Desso DLW Sports Systems Int., *Grass Master* .
Mike Sorensen, *Utah Has A New Turf,* Deseret News.
*First Notts Sports Commercially Installed Putting Green Passes All Expectations! . . . VHAF Explained.*
Safety Play Systems Inc., *VHAF Erosion Control Fabric,* Sep. 10, 1992.
Nelton, *Nelton Advanced Turf—Where Turf Alone Would Fail,* Jan. 1992.
*Plastic Grass,* Turf Management May, 1997.
Sportgrass Inc., *Guidelines for Establishment and Maintenance of SportGrass™ Athletic Fields,* Maintenance Manual.
2–page English language parts list for the 4 above Japanese references.

*Primary Examiner*—Leon B. Lankford, Jr.
*Attorney, Agent, or Firm*—Wood, Herron & Evans, L.L.P.

[57] ABSTRACT

A stabilized natural turf surface particularly suitable for athletic fields includes a mat interposed between upper and lower layers of growth media, the mat having a woven biodegradable backing and upwardly extending artificial fibers secured thereto, wherein the fibers extend well above the top of the upper layer. Natural grass plants grow in the upper layer, with the crowns being located in the upper layer of growth media and the roots extending down through the backing and into the lower layer. The mat helps to stabilize root growth, particularly during the first few years. The biodegradability of the backing results in its eventual decomposition, so that after a predetermined time the turf surface may be aerated all the way down to the lower layer without adversely affecting the mat and the mat can be top dressed beginning immediately after turf growth occurs. The biodegradability also prevents the creation of an agronomic barrier between the upper and lower layers.

20 Claims, 1 Drawing Sheet

U.S. PATENT DOCUMENTS

| | | |
|---|---|---|
| 3,863,388 | 2/1975 | Loads . |
| 3,995,079 | 11/1976 | Haas, Jr. . |
| 4,023,506 | 5/1977 | Robey . |
| 4,044,179 | 8/1977 | Haas, Jr. . |
| 4,337,283 | 6/1982 | Haas, Jr. . |
| 4,389,435 | 6/1983 | Haas, Jr. . |
| 4,396,653 | 8/1983 | Tomarin . |
| 4,444,815 | 4/1984 | Friedrich . |
| 4,462,184 | 7/1984 | Cunningham . |
| 4,572,700 | 2/1986 | Mantarro et al. . |
| 4,735,825 | 4/1988 | Friedrich . |
| 4,790,691 | 12/1988 | Freed . |
| 4,819,933 | 4/1989 | Armond . |
| 4,867,614 | 9/1989 | Freed . |
| 4,913,596 | 4/1990 | Lambert, III . |
| 4,916,855 | 4/1990 | Halliday et al. . |
| 4,941,282 | 7/1990 | Milstein . |
| 5,014,462 | 5/1991 | Malmgren et al. . |
| 5,205,068 | 4/1993 | Solomou . |
| 5,224,290 | 7/1993 | Molnar et al. . |
| 5,326,192 | 7/1994 | Freed . |
| 5,344,470 | 9/1994 | Molnar et al. . |
| 5,346,514 | 9/1994 | Molnar et al. . |
| 5,397,368 | 3/1995 | Molnar et al. . |
| 5,464,455 | 11/1995 | Molnar . |
| 5,489,317 | 2/1996 | Bergevin . |
| 5,490,351 | 2/1996 | Molnar et al. . |
| 5,507,845 | 4/1996 | Molnar et al. . |
| 5,555,674 | 9/1996 | Molnar et al. . |
| 5,586,408 | 12/1996 | Bergevin . |

FOREIGN PATENT DOCUMENTS

| | | |
|---|---|---|
| 3703866 | 8/1988 | Germany . |
| 3723364 | 1/1989 | Germany . |
| 8200994 | 8/1992 | Germany . |
| 53-12742 | 6/1977 | Japan . |
| 5915183 | 8/1984 | Japan . |
| 4-24432 | 1/1992 | Japan . |
| 4-24432 | 2/1992 | Japan . |
| 7-207614 | 8/1995 | Japan . |
| 8-228512 | 9/1996 | Japan . |
| 9-201127 | 8/1997 | Japan . |
| WO 98/20205 | 5/1998 | WIPO . |
| WO 98/23817 | 6/1998 | WIPO . |

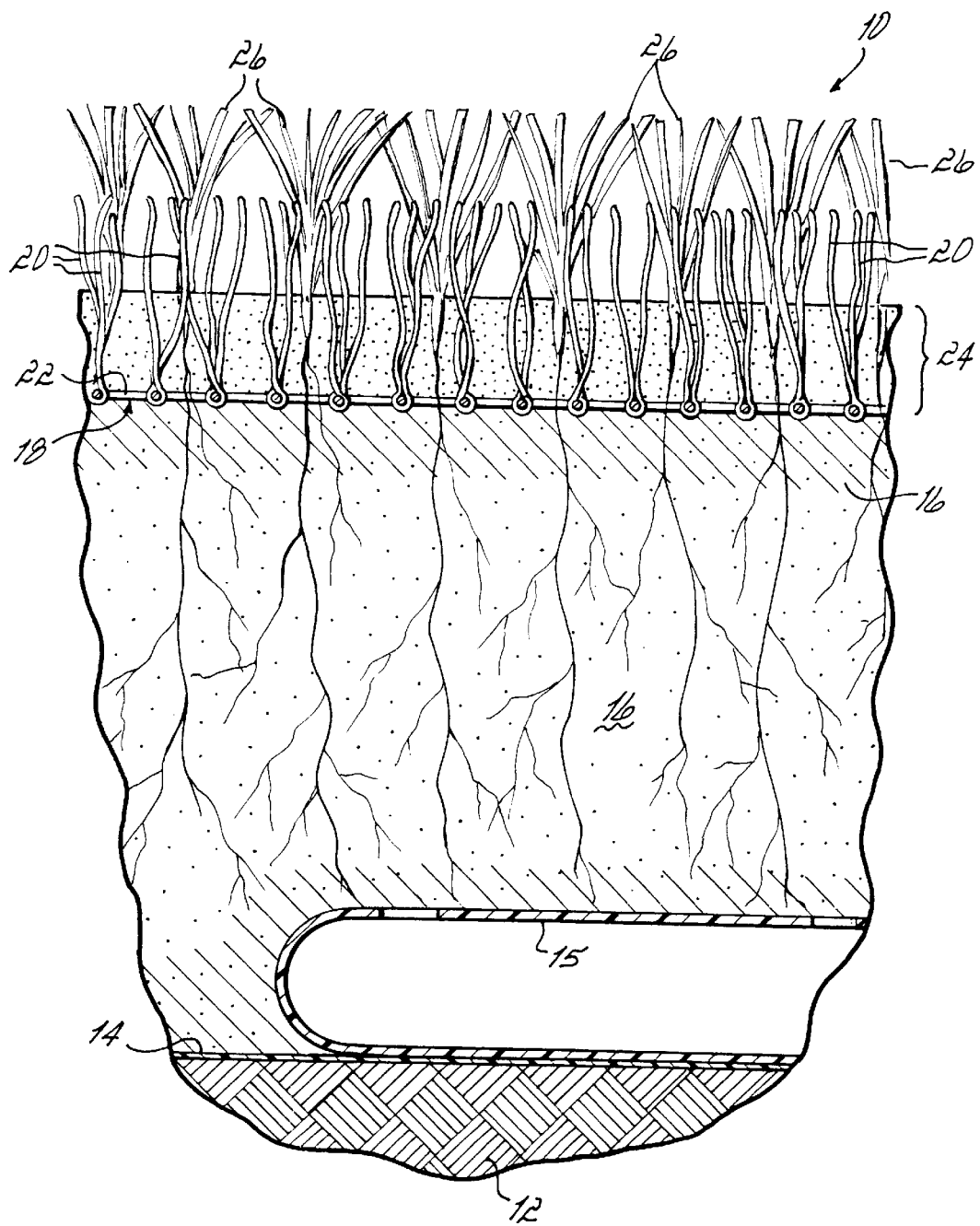

STABILIZED NATURAL TURF FOR ATHLETIC FIELD

FIELD OF THE INVENTION

This invention relates to a natural turf surface for athletic fields, and more particularly to a natural turf surface stabilized by synthetic fibers filled within a sand base.

BACKGROUND OF THE INVENTION

Since Robey U.S. Pat. No. 4,023,506, it has been known that an artificial mat made of fibers can be used to enhance the stability of a natural turf surface, by providing enhanced holding power for the root system of the natural grass. Thereafter, U.S. Pat. Nos. 4,044,179 and 4,337,283, issued to Haas, Jr., disclosed a surface comprising an artificial mat with upright fibers, with sand filled onto the mat to provide lateral support for the fibers. The primary purpose of the inventions disclosed in these patents was to provide a stable maintenance free surface for a variety of uses, such as a landing area for golf ball driving ranges, or even golf courses, but the primary objective did not include the growing of natural turf through the mat.

Thereafter, European patent applications EP 0 174 755 A1 and EP 0 403 008 A1 disclosed the combination of an artificial mat for stabilizing a natural turf which extends through the mat, wherein the mat includes a horizontal backing and upright fibers supported laterally by a fill layer, such as sand. More recently, U.S. Pat. Nos. 5,489,317 and 5,586,408, issued to Bergevin, disclosed a structure very similar to the other structures, but with the specific feature of the sand fill layer terminating at the same vertical level as the tops of the artificial fibers. As indicated in the Bergevin patents and in the prosecution histories thereof, this relatively thick layer of sand is necessary to uniformly hold the mat down, and also to initiate natural plant growth at a vertical level which is very near to the top ends of the artificial fibers. However, such a substantial sand fill layer atop the artificial mat and surrounding the artificial fibers forms a tight, compacted uniform playing surface. As a result, the playing surface becomes slick and hard once the turf begins to wear. The Bergevin patents also disclose the feature of coating or covering the artificial mat with latex to hold the artificial fibers for 2–3 weeks until the turf is established and roots have grown through the mat.

Another shortcoming of turf systems utilizing an artificial mat such as those disclosed in the Bergevin patents is the interface between adjacent mat sections. When such systems are installed on site at the athletic field, the artificial mats may shift or become exposed in response to player movement which is very detrimental. Sod pieces which become dislodged and pushed around by player movement or divots in the case of a golf course turf are undesirable for athletic fields. Differential shifting or vertical movement of one artificial mat section relative to another also commonly results from rolling the turf, which is a common turf maintenance practice. If the roller does not span the juncture between adjacent mats then the rolled mat often shifts downwardly thereby creating a discontinuity or unevenness in the turf surface and a potential tripping hazard or other undesirable condition. One measure which has been attempted to counteract this differential shifting of the artificial mats is the placement of a heavy mat, such as a geo-textile grid or expanded polyethylene mat to underlay and straddle the juncture between the artificial mat sections. However, this adds to the complexity and cost of such turf systems and often does not cure the problem of differential shifting of the artificial mat sections.

These recent developments in combining artificial fibers with natural grass plants have resulted in only limited advances in the stability of natural turf surfaces, particularly but not exclusively for natural turf surfaces used for athletic fields which are constructed of soils high in sand content. The relatively slow market acceptance of these surfaces to date seems to indicate that there is room for improvement, primarily from an agronomic standpoint.

For one thing, it is a commonly understood turf management practice to provide periodic layers of "top dressing," usually sand, on a natural turf athletic surface, such as a ball field or golf course putting green or tee. The periodically applied layers of top dressing provide stability and some degree of firmness to the ground, but more importantly create and then help maintain an environment conducive to healthy plant growth and rapid recovery from use.

Even though most well kept athletic surfaces for sport purposes are maintained in such a way that the grass clippings are collected, rather than simply allowed to disperse on the surface, with natural grass plants, particularly under the intense maintenance regimes common for professional and collegiate facilities, there is considerable production and decomposition of plant and root matter which can quickly build up on the surface. This decomposing plant matter will eventually form a thick organic layer which is undesirable for athletic playing surfaces. If not properly managed, this organic layer has a severely negative effect on drainage, movement of nutrients and pesticides into the root system and playability, including footing, surface speed, wear tolerance, ball roll and bounce, etc. The organic layer can result in a condition known in the industry as "black layer" whereby the organic matter becomes anaerobic due to poor drainage and a loss of capacity for gas exchange all of which severely limit root growth and overall plant health.

Several turf management strategies are nearly universally recommended and implemented to ameliorate these harmful conditions. One such strategy includes the periodic application of a sand top dressing. However, with respect to the surface disclosed in the Bergevin patents, the application of additional layers of top dressing would eventually result in completely burying the upright artificial fiber, so that they would not be able to perform their intended purpose of providing lateral stability for the turf surface. Also, the application of a top dressing would produce a loose sand layer above the fibers, and therefore not be desirable. For that reason, it is applicant's belief that the application of a layer of top dressing to a surface of that type would reduce the stability enhancing benefits of the fibers, while failure to apply a layer of top dressing would have the undesired effect of allowing the build up of a residue of decomposing plant matter. For these reasons, the written turf management guidelines of one patented product specifically emphasizes that applications of sand top dressing should not be practiced because it would negate the beneficial aspects of that product.

Another commonly recommended and practiced turf management strategy involves aerating a natural turf surface. As with providing a layer of top dressing, aerating is periodically performed to decrease the build-up of organic matter on the surface, decrease compaction, keep the surface well drained and to maintain a tight and vigorous natural turf canopy. Typically, aerating is done 4–6 times per year on high performance sports fields by inserting and removing hollow tines which are a one half to three quarters inch in width into the turf. In order to penetrate an entire thatch layer and enter the root zone area of the natural turf it is necessary to aerate to a depth of three inches or greater.

Unfortunately, with the various prior art artificial mats described above, it is impossible to aerate down to the desired depth because doing so is prevented by the horizontal backing which holds the upright fibers. Again, the manufacturer of one such product recognizes this problem and cites in its management manual that aeration should not be implemented. Thus, while the mat may provide one agronomic advantage of increased stability for the natural turf surface, the backing of the mat hinders the performance of the most basic turf management practices, namely aerating, and sand top dressing.

The horizontal backing of the mat also serves as a barrier between the layers above and below the mat. This can adversely affect drainage of the field or subirrigation of the field. This concern arises particularly with respect to subsurface drainage, irrigation and heating systems, and controls therefor, as disclosed in applicant's currently pending PCT application Ser. Nos. PCT/US95/11891 and PCT/US96/02207. In essence, the mat and its resultant organic layer create a zone above the underlying growing medium which acts to create a "perched water table", a term understood by those skilled in the art. By creating a perched water table at the top of the root zone, downward movement of water and nutrients and upward movement of water by capillary action ("wicking") during sub-irrigation and the natural phenomenon of evapo-transpiration are significantly inhibited.

Oftentimes, a stabilized natural turf of this type is initially grown on a sod farm, on top of a plastic layer, until it is ready to be cut and then transported to the ultimate site where it is to be used. Since the transporter will typically pay transportation costs which are directly proportional to the weight of the material being transported, it is desirable to minimize the overall weight of the components which make up the stabilized athletic turf grown at the sod farm. Large layers of sand atop the artificial mat are counter-productive in this regard.

Another problem with turf systems having an artificial mat and grown on sod farms is the harvesting of the turf and the waste associated therewith. When such turf systems are installed on the sod farm, typically 12–15 foot wide mats are rolled out and the sides of adjacent mats are abutted but not connected. They may be overlapped and pinned down with landscape spikes to keep them from sliding around during sanding, and the spikes are then removed at a later time. After being placed and pinned, the area is top dressed and turfed. When it comes time to harvest, ideally one would like to have the sod cut lines (rolls cut 30"–48" wide typically) match the mat widths. This is virtually impossible because it would mean that the sod harvester would have to follow exactly the original edge of the mat which cannot be seen because it is covered with turf. Any deviation from the mat line during harvest, however, leaves a narrow piece of mat between the mat line and cut line. And because there is not sufficient integrity for the roots along the cut line to hold that wedge of mat to the adjoining piece, the entire roll could become wasted, as it is critical to maintain precise roll widths. For this reason, harvesters of such systems typically begin cutting rolls 6"–12" on either side of the mat line, leaving that much of a strip wasted.

SUMMARY OF THE INVENTION

It is an object of the invention to improve upon the stability of a natural turf surface, particularly for athletic fields, while at the same time allowing the natural turf surface to be compatible with readily accepted turf management practices such as aeration and top dressing.

It is another object of the invention to achieve a stable natural turf surface with minimal organic residue at the surface thereof, and improved drainage capability.

It is still another object of the invention to achieve a stabilized natural turf surface which is more efficiently harvested at a sod farm without waste and then economically and conveniently transported from the sod farm to another site, such as a stadium.

It is still another object of the invention to achieve a stable natural turf surface which is more compatible with state of the art subsurface control systems for drainage and irrigation.

It is still another object of the invention to achieve such a natural turf surface which includes artificial fibers upon installation which over time and as a result of accepted turf management practices become distributed over the root zone.

The present invention achieves the above-stated objects by utilizing, in conjunction with a natural turf surface, an improved stabilizing mat having artificial upright fibers secured to a woven biodegradable horizontal backing. The backing eventually decomposes to allow aeration of the natural turf surface, at any desired depth. The decomposition of the backing also improves drainage and subirrigation, by eliminating any barrier effect associated with the artificial fibers.

Additionally, the invention contemplates treating the biodegradable backing so as to accelerate or decelerate the biodegrading process, as desired. Normally, the backing simply decomposes within about one year or so. This time should be sufficient to enable stable root growth for the natural grass plants. However, under certain circumstances the period for decomposition of the backing may be extended or shortened as required by treating the backing. To control the decomposition rate of the backing by accelerating or decelerating the rate, a decomposition agent, such as copper sulfate for deceleration of the decomposition, can be applied as, for example, by spraying the mat. Alternatively, the decomposition rate of the mat can be decelerated by spraying a light spray of a plasticizer or rubberizing compound on the mat. Another way to accelerate or decelerate the decomposition of the backing is to decrease or increase, respectively, the density of the weave of the fibers used to make the backing. However, the weave must be sufficiently dense to provide the desired density for the upright artificial fibers.

Once the backing has decomposed, there is no longer any hindrance to normal drainage or vacuum assisted drainage as is common with some of the more sophisticated state of the art control systems for athletic fields around the world.

According to a preferred embodiment of the invention, the improved mat comprises upright artificial fibers made of polypropylene secured to a horizontal backing woven out of jute. The mat, i.e., the backing with the fibers secured thereto, is laid upon a lower fill layer, such as sand, then an upper fill layer is applied thereto. Preferably, the upper fill layer extends only about halfway up the artificial fibers. Natural grass plants extend upwardly above the upward layer, with roots that extend downwardly through the backing and into the lower layer.

The use of an upper fill layer which resides below the upper ends of the artificial fibers allows the application of top dressing to the natural turf surface, in a manner which does not bury the fibers in the short term. By allowing this turf management practice of periodically applying top dressing, the invention eliminates the undesired build up of organic residue at the surface. Moreover, compared to some prior systems, this invention uses a lower volume of sand. Thus, since the turf may be grown initially at a sod farm and then transported to the stadium, this invention helps to reduce overall weight of the harvested turf, and hence transportation costs.

Advantageously, the jute woven backing of the mat will hold moisture and soluble nutrients, unlike the artificial backing materials of prior art systems, which is particularly beneficial in the turf establishment period.

Additionally, the turf system of this invention permits the common and beneficial practice of aeration of the turf to promote the healthy maturation of the natural grass plants. Moreover, as the jute backing decomposes and the grass plants mature, aeration of the turf system will disperse the artificial fibers and increase the root zone depth of the turf.

Compared to the prior art Bergevin patents which disclose the general concept of a secondary coating, such as latex, on the artificial backing which coating is biodegradable and meant to hold the artificial fibers in the mat for only 1–3 weeks, this invention represents an improvement because the entire woven backing in one embodiment is of homogenous composition, with transversely (weft) and longitudinally (warp) extending fibers being of a biodegradable material, such as jute.

The jute or other biodegradable backing also provides important advantages in both turf stability and economics for turf grown at a sod farm. Specifically, the backing can be sewn to adjacent sections of backing to provide a seamless turf.

In another presently preferred embodiment, the longitudinal backing fibers can be made of or supplemented with a plastic, such as polypropylene, and woven into the jute to provide reinforcement and added strength to the material and slow the overall decomposition rate of the mat.

These and other features of the invention will be more readily understood in view of the following detailed description and the drawing.

BRIEF DESCRIPTION OF THE DRAWING

The FIGURE is a cross-sectional view of a natural turf surface in accordance with a preferred embodiment of the invention.

DETAILED DESCRIPTION OF THE DRAWING

The FIGURE shows, in cross-section, a stabilized natural turf surface 10 in accordance with a preferred embodiment of the invention. The surface includes a compacted subsurface 12, which is typically graded to a desired level with a desired degree of uniformity. If desired, a barrier 14 may reside on the subsurface 12, the barrier supporting one or more drainage components 15 for draining, subirrigating or heating the surface 10, as disclosed in applicant's presently pending PCT patent application Ser. Nos. PCT/US95/11891 and PCT/US96/02207, which are expressly incorporated by reference herein in their entirety. Alternatively, the natural turf surface 10 may be installed over sand or soil fields which may or may not have a prepared or compacted subsurface and installed drainage or irrigation components.

A lower fill layer 16 of growth media, such as sand, soil or the like, resides above the subsurface 12, at a depth which varies depending upon the application; however, typically sand sports fields are constructed with about 6–12 inches of fill layer 16. A stabilizing mat 18 rests on the lower layer 16. The mat 18 has upright fibers 20 which extend upwardly from a horizontal backing 22. These fibers 20 are preferably made of polypropylene and have a length dimension above the mat which is in the range of about 1–2 inches, although the length could be lesser or greater, and a target denier in the range of about 7,600–10,000. Typically the fibers 20 are made from a tape which is fibrillated, and then spun into a thread at a rate of ¾ twist/inch, although those skilled in the art readily understand that this is only one of several methods of manufacturing the synthetic fibers 20. The fibers 20 are secured to the backing 22 preferably at a density of 11.5 stitches per 3 inch section and a stitch gauge of ⅜" to ⅝".

The jute backing 22 is biodegradable, so that it will decompose within a predetermined time period. However, other natural, biodegradable materials such as cotton, flax or the like could be used. Preferably, the backing 22 is woven, with transversely and longitudinally extending fibers of the backing being made of the same material, such as jute, so that the backing 22 is homogenous. Preferably the backing has a weave density of 15 threads by 13 threads per square inch, resulting in a weight of approximately 9 oz. Per square yard. The fibers 20 are held to the backing 22 by stitching, resulting in a mat whose face weight is preferably 20–30 oz.

An upper fill layer 24 is located above the stabilizing mat 18. Again, as with the lower layer 16, the upper layer 24 may be of sand, or any other particulate material which promotes plant growth and provides stabilization and cushion such as diatomaceous material, calcined clay, crumbed rubber or other organic or inorganic additives. The upper layer 24 resides within and surrounds the upright fibers 20 of the stabilizing mat 18, to laterally support the fibers 20 in a generally upright position and to provide stabilization for the turf surface 10. Preferably, the upper layer 24 extends about halfway up the vertical length of the fibers 20, to allow sufficient room for ongoing application of layers of top dressing, and to reduce overall weight which is particularly advantageous in the case of sod farm production. The layer 24 preferably resides at least 0.50" below the tops of the fibers 20.

Finally, natural grass plants 26 reside generally above the upper layer 24, with the tops 28 of the plants 26 extending above the fibers 20 and the upper layer 24, and the roots 30 of the natural plants 26 extending downwardly through the upper layer 24, through the backing 22 and into the lower layer 16. Preferably, the upper layer 24 and/or the lower layer 16 is inoculated with microbes to establish a beneficial population of micro-organisms, since sand is typically sterile, prior to sodding the upper layer 24 with grass plants 26.

It is anticipated that exposing approximately the upper half of the fibers 20 above the upper layer 24 will result in the "ballooning" of the tips of the fibers 20. Ballooning, as will be understood by one of ordinary skill in the art, results when the exposed tips of the fibers 20 fray and/or fluff, which is beneficial to the turf system 10 because it will promote fibrillation and movement of the fibers 20 throughout the depth of the turf system 10 in response to normal wear, aeration and/or standard turf maintenance procedures.

The backing 22 is made by weaving jute fibers, similar to what was previously done with respect to the manufacture of primary backing for carpet, before the standardized use of synthetic materials for that purpose. Whereas the jute backing of carpet represented a disadvantage, because the jute was susceptible to moisture retention if the carpet became wet, in this application the jute backing provides an agronomic advantage in that the moisture retention promotes growth of the natural grass plants 26. The natural jute preferably has a dense weave of about 9 oz., 1 square yard, and a sheet width of 12–15 feet.

After the stabilizing mat 18 is woven, it may be treated with a decomposition agent to promote acceleration or deceleration of its eventual decomposition. With the backing 22 having a weave density of about 15×13 threads per square inch and a weight of about 9 oz. per square yard, it is believed that the backing 22 will decompose within about 8–12 months. It is believed that the use of the decomposing agent can cause this decomposition time period to be accelerated up to about 6 months, or decelerated to beyond 18 months. The decomposition agent can be applied by spraying, wiping or any other suitable manner of providing generally uniform application.

One proposed method of accelerating the decomposition rate would include inoculating the backing 22 or the fill layer 16 prior to placement of the mat 18 with biological agents which use cellulose from the jute backing 22 for energy.

Optionally, the backing 22 may be reinforced for added strength as may be required for certain applications. The reinforcement may be by increasing the thickness of the transverse and/or longitudinal fibers or a synthetic strand, fiber or filament such as polypropylene could be laced into the weave of the backing 22 or replace the transverse and/or longitudinal fibers.

After the backing 22 is complete, the fibers 20 are secured thereto in the predetermined density, preferably by stitching with a ⅝" gauge, in an acute zig zag pattern to maximize the amount of material on the underside of the backing. This provides additional horizontal strength and increases the ability to redistribute fibers through the rootzone during aeration. The artificial mat 18 is then ready for use.

If the structure shown in the FIGURE is initially grown at a sod farm in preferably 12 or 15 feet wide sections of any desired length, the lower layer 16 resides on a synthetic barrier (not shown) of some sort. Everything else thereabove remains the same. Once a sufficient growing time period has passed, and there has been sufficient growth of the roots 30 through the backing 22, the natural turf 10 is ready to be cut to length and transported to a site for use, such as an athletic stadium. If the turf 10 is grown on a sod farm, the backing 22 is positioned atop a preferably plastic barrier layer to inhibit root growth into lower layers. Because of the relatively low height of the upper layer 24 with respect to the upper ends of the fibers 20, the natural turf system 10 of this invention has a relatively low overall weight. As noted previously, this helps to reduce shipping costs.

Preferably, the individual sections of the mat 18 are joined to adjacent sections of the mat 18 by sewing the backing 22 sections together to form a sewn seam (not shown) using either a fabric thread such as jute or a synthetic thread such as polypropylene. Sewing the adjacent sections of mat 18 together is advantageous irrespective if the turf 10 is initially installed on-site or grown at a sod farm. As previously discussed, known turf systems with artificial backings often require a reinforced foundation underlying the adjoining backing sections to minimize differential settling or vertical shifting of one section relative to the adjacent section. On the other hand, when the turf 10 of this invention is installed on-site at the athletic facility, the stability of the turf 10 is significantly increased because the adjacent mat sections would neither shift relative to one another nor become exposed and present a detriment to play as in prior turf systems. With respect to sod farms, sewing the backing 22 sections together at a seam makes harvesting the turf 10 much easier and decreases turf waste during harvesting of the turf 10. Sewn seams produce an essentially uniform mat 18 so that cutting rolls of typically 30–48 inch wide turf 10 can begin at any appropriate position without regard for the position of the seam. This results in virtually no waste of the harvested turf, unlike harvesting procedures required in known artificial backing systems.

Once installed at the site, or once grown at the site, the natural turf surface 10 of this invention provides a stable playing surface with a stable base and a completely natural turf look and feel. As previously discussed, if the natural turf surface 10 is grown at the site, the preferably 15 foot wide sections of the jute backing 22 are sewn together along their common adjacent edges to form an essentially continuous backing 22 for the natural turf surface 10. Common turf management practices can be used with this natural turf surface 10, such as top dressing and aeration, because of the relative height of the upper layer 24 with respect to the fibers 20 and because the backing 22 eventually decomposes. In addition to allowing normal aeration, decomposition of the backing 22 also eliminates the barrier effect caused by prior stabilizing mats having a backing of artificial composition. Thus, the natural turf surface 10 of this invention promotes drainage and subirrigation of the lower layer 16 and the upper layer 24, and even heating thereof, via sophisticated controls as described in applicant's above-identified applications which have been incorporated herein by reference.

As the turf 10 of this invention matures and top dressing is applied, the aeration of the turf 10 redistributes the fibers 20 from a more dense, uniform, woven mat 18 preferably about 1.25" thick, to a less dense, more fibrillated zone of about 3"–4" thick. As a result, the turf 10 does not at any time have sand filled fibers 20 of a uniform height and density at the surface and yields a better overall playing surface once the turf is worn because the hardness and highly dense turfs of prior art systems are avoided while still providing root zone integrity for stability.

While a preferred embodiment of the invention has been described, it will be readily understood by those skilled in the art that variations may be made thereto without departing from the spirit of the invention. For instance, there may well be other materials other than jute for making the backing 22 of the artificial mat 18. Moreover, for such other materials, the weave density or the fiber thickness may be subject to variation. Moreover, depending upon the growth environment and the agronomic conditions, the relative thickness of the lower layer, and the upper layer relative to the artificial fibers may change. These factors may also depend upon the type of grass which is being used.

We claim:

1. A natural turf surface suitable for athletics comprising:
   a compacted subsoil;
   a first layer of growth media located above the subsoil;
   a mat supported on the first layer, the mat including biodegradable root permeable backing oriented horizontally and a plurality of substantially vertical artificial fibers held by the backing;
   a second layer of growth media located on the mat;
   natural grass plants having roots and crowns, the roots extending downwardly through the second layer and the mat and into the first layer and the crowns extending above the horizontal backing; and
   the backing including a decomposition affecting agent so that the backing biodegrades within a predetermined time period, thereby to facilitate aeration of the natural turf down to the depth of the first layer and to promote dispersion of the fibers within a stabilization zone having a greater vertical dimension than the second layer.

2. The natural turf surface of claim 1 wherein the first and second layers of growth media comprise sand.

3. The natural turf surface of claim 1 wherein the backing is woven.

4. The natural turf surface of claim 3 wherein the horizontal backing comprises multiple sections joined together by stitched seams.

5. The natural turf surface of claim 3 wherein the backing is of homogenous composition.

6. The natural turf of claim 1 wherein the backing comprises jute.

7. The natural turf surface of claim 1 wherein the artificial fibers have a length in the range of about 1.25" to about 1.75".

8. The natural turf surface of claim 1 wherein the second layer of growth media terminates at least ½" from upper ends of the artificial fibers.

9. The natural surface of claim 1 wherein the backing is woven, with a density of about 15×13 threads per square inch and a weight of about 9 oz. per square yard.

10. The natural turf of claim 9 wherein the artificial fibers are held to the backing and each fiber has a height in the range of about 1.25" to about 1.75" and a width in the range of about 7,500 to about 10,000 denier.

11. The natural turf of claim 1 wherein the decomposition affecting agent for the backing is a polymer coated thereon to retard decomposition.

12. A stabilizer for stabilizing the subsurface of a natural turf surface, made according to the process comprising:
creating a backing of biodegradable material, the backing being of sufficient porosity to permit downward growth therethrough of the roots of natural grass plants;
treating at least one surface of the backing with a decomposition affecting agent to affect decomposition of the backing within a predetermined time period; and
securing artificial fibers to the backing, at a predetermined density, thereby to stabilize the natural grass plants.

13. The stabilizer of claim 12 wherein treating further comprises coating the backing with cellulose-decomposing microbes.

14. The stabilizer of claim 12 wherein said creating includes weaving a homogenous primary backing and said treating includes applying a secondary to the woven homogenous primary backing.

15. A method of preparing and maintaining stabilized natural turf, comprising:
a) preparing a subsurface;
b) placing a first layer of growth media on the prepared subsurface;
c) placing a mat on the first layer, the mat having a biodegradable backing and a plurality of upwardly extending artificial fibers held thereto;
d) laying a second layer of growth media on the mat, so that the top of the second layer resides below the upper ends of the artificial fibers;

e) growing natural grass plants in the second layer, with roots thereof extending downwardly through the mat and into the first layer resulting in a stabilized turf; and
f) aerating the stabilized turf down to the first layer after the backing has begun to biodegrade, thereby to facilitate dispersion of the fibers within the first and second layers of growth media.

16. The method of claim 15 wherein the:
backing has been treated with a decomposition affecting agent to cause biodegrading to occur within a predetermined time period, thereby to facilitate aeration down to the first layer.

17. The method of claim 15 and further comprising:
top dressing the stabilized turf.

18. The method of claim 15 wherein the second layer of growth media on the mat is laid only up to approximately one-half the height of the artificial fibers.

19. A method of making a field suitable for athletics comprising:
growing a surface of natural grass plants having roots and crowns, the roots extending downwardly into an upper layer of growth media and a lower layer of growth media, the upper and lower layers of growth media being separated by a mat having a biodegradable backing oriented horizontally and a plurality of substantially vertical artificial fibers held by the backing; and
aerating the surface down to the lower layer of growth media after the backing has begun to biodegrade whereby the aerating vertically disperses and reorients the artificial fibers throughout the upper and lower layers of growth media, thereby to increase the stabilized zone for the roots of the natural grass plants.

20. A natural turf surface suitable for athletics comprising:
a compacted subsoil;
a first layer of growth media located above the subsoil;
a mat supported on the first layer, the mat including a substantially biodegradable backing oriented horizontally and a plurality of artificial fibers held by the backing, the backing having moisture retaining capability and being root permeable;
a second layer of growth media located on the mat;
natural grass plants having roots and crowns, the roots extending downwardly through the second layer and the mat and into the first layer and the crowns extending above the horizontal backing and residing in the second layer;
whereby the horizontal backing biodegrades within a predetermined time period, thereby to facilitate aeration of the natural turf down to the depth of the first layer and to promote dispersion of the fibers within a stabilization zone having a greater vertical dimension than the second layer.

* * * * *